United States Patent
Langthaler et al.

(10) Patent No.: US 7,770,440 B2
(45) Date of Patent: Aug. 10, 2010

(54) METHOD TO TEST A DYNAMIC TORQUE-GENERATING DEVICE AND A DEVICE TO DETERMINE THE DYNAMIC BEHAVIOR OF A DRIVING SHAFT

(75) Inventors: Peter Langthaler, Puchenau (AT); Engelbert Grünbacher, Vöcklabruck (AT); Gerald Steinmaurer, Wels (AT); Luigi del Re, Linz (AT); Helmut Kokal, St. Josef (AT); Michael Paulweber, Hausmannstätten (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 11/451,631

(22) Filed: Jun. 13, 2006

(65) Prior Publication Data
US 2006/0288764 A1 Dec. 28, 2006

(30) Foreign Application Priority Data
Jun. 15, 2005 (AT) .............................. GM400/2005

(51) Int. Cl.
*G01M 15/02* (2006.01)
(52) U.S. Cl. ............... 73/115.05; 73/114.15; 73/114.25
(58) Field of Classification Search .............. 73/114.15, 73/114.24, 114.25, 114.77, 115.01, 115.02, 73/115.05
See application file for complete search history.

(56) References Cited

U.S. PATENT DOCUMENTS

| | | | | |
|---|---|---|---|---|
| 4,680,959 A | * | 7/1987 | Henry et al. | 73/117 |
| 4,995,139 A | * | 2/1991 | Suzuki | 73/116 |
| 5,986,545 A | * | 11/1999 | Sanada et al. | 340/439 |
| 6,434,454 B1 | * | 8/2002 | Suzuki | 701/29 |
| 6,634,218 B1 | * | 10/2003 | Nakanishi et al. | 73/116 |
| 2002/0091471 A1 | * | 7/2002 | Suzuki | 701/29 |
| 2002/0134147 A1 | * | 9/2002 | Janelle et al. | 73/116 |
| 2004/0040374 A1 | * | 3/2004 | Nakanishi et al. | 73/116 |
| 2005/0044933 A1 | * | 3/2005 | Laws | 73/117.3 |
| 2006/0106526 A1 | * | 5/2006 | Sugita et al. | 701/114 |

FOREIGN PATENT DOCUMENTS

| DE | 4328537 | 3/1995 |
|---|---|---|
| SU | 429302 | 1/1975 |

OTHER PUBLICATIONS

Abstract of DE 4328537.
Abstract of SU 429302.

* cited by examiner

*Primary Examiner*—Eric S McCall
(74) *Attorney, Agent, or Firm*—Dykema Gossett PLLC

(57) ABSTRACT

The course of torque transmitted though a driving shaft (3) between torque generating device (1) to be tested and a driving or loading mechanism (2) is determined during an identification phase in the completely constructed test bench with the use of a rotating driving or loading mechanism (2) at pseudo-stochastic rotational speeds. Determined are thereby parameters describing in a real and current manner the dynamic behavior of the driving shaft (3) whereby the parameters are used as an influence in further testing.

9 Claims, 2 Drawing Sheets

METHOD TO TEST A DYNAMIC TORQUE-GENERATING DEVICE AND A DEVICE TO DETERMINE THE DYNAMIC BEHAVIOR OF A DRIVING SHAFT

BACKGROUND OF THE INVENTION

1. Field of the Invention

The invention relates to a method for testing a dynamic torque generating device on a test bench, particularly an internal combustion engine on the engine test bench, including an adjustable dynamic rotating mechanism serving as driving or loading mechanism connected to a torque generating device by a driving shaft. The invention relates furthermore to a device for determining the dynamic behavior of a driving shaft on a test bench and to test a dynamic torque generating device using an adjustable dynamic rotating mechanism serving as a torque source or a torque sink rotationally connected to both sides or at least to one side of the driving shaft.

2. The Prior Art

Correspondingly dynamic or highly dynamic adjustable rotating mechanisms, such as electric motors, hydraulic engines or the like are currently used as driving or loading mechanisms for the most realistic testing of dynamic torque generating devices such as an internal combustion engine provided as a driving motor for a motor vehicle, for example, whereby said driving or loading mechanisms are in most cases not connected directly to the torque generating device to be tested but they are connected by means of a driving shaft. Dynamic loads develop in the torque transmission elements and they are effective between the respective torque source and torque sink, which can reach undesirable or even inadmissible values based on the occurring torque event and the adjustment of the entire system. To avoid this and possible damages resulting thereby, the driving shafts are up to now designed having a well defined stiffness and damping characteristic allowing certainly a reliable operation of the test bench whereby the corresponding values are selected based on the existing geometric conditions and the material in use. Higher stiffness and lower damping characteristic result basically in lower losses and higher dynamics; however, they demand higher requirements in test bench adjustment.

In the above mentioned driving and loading mechanism, the coupling through the driving shaft determines directly in which way the loading and driving mechanism can influence the dynamics of the entire system and thereby also the torque generating device to be tested. Since the torque generating device can usually not be described through a linear system, the entire system can also not be described simply as a linear system. Irregularities in friction in the torque generating device must be included in the evaluation as a substantial interference which makes the determination of the relevant parameters of a driving shaft considerably more difficult. According to current traditional standards, the actual characteristics of the driving shaft are measured in the disassembled condition and the corresponding parameters are fed into the operational or adjustment system of the test bench to make possible the correct operation of the driving and loading mechanism without the above-described risks. This method has basically the disadvantage that in the real assembly there are always differences between the measured or theoretically calculated parameters and the actual and therefore relevant parameters of the driving shaft—partly because of the installation and partly because of wear or defects, which can occur later or which can occur in varied ways.

The present invention is based on the fact that accurate and current information can be considerably improved relative to the substantial parameters of the torque transmission path influencing the dynamics, particularly in the driving shaft, including the adjustment quality of the test bench as well as monitoring of the dynamic loads. If the corresponding parameters are known only vaguely, then the adjustment parameters must be set with much more care—or, moreover, if changes in relative parameters are observed during the test bench operation or at least before the start of a specific test phase, then a defect on the driving shaft or on the mounting can be detected or even predicted. Realistic and current monitoring of the relevant parameters could be used as an indicator of increasing wear or faulty measuring. The object of the invention is therefore to obtain information of this type.

SUMMARY OF THE INVENTION

Based on the above-mentioned ideas, the present invention achieves the stated object in the aforementioned method in that the course of torque transmitted though the driving shaft is determined during an identification phase in the completely constructed test bench with the use of a rotating driving or loading mechanism at pseudo-stochastic rotational speeds and determined are thereby the parameters describing the dynamic behavior of the driving shaft and whereby said parameters are used as an influence in further testing. The device of the invention is accordingly characterized in that the torque generating device to be tested is employed as a torque source or torque sink on the completely constructed test bench, on the one hand, and an adjustable dynamic rotating mechanism serves as a driving or loading mechanism for the test, on the other hand. In this way, the driving shaft is dynamically stressed in the identification phase occurring before or during the actual test on the completely constructed test bench in the same manner as during the test of the torque generating device so that the thereby detected corresponding parameters describe also the real and respective current behavior of the shaft, whereby the immediate use of these detected parameters can be advantageously included as an influence in further testing.

According to the invention, the detected parameters can be used to set the adjustment of the control for the driving or loading mechanism. Another embodiment is also advantageous wherein these parameters are compared to predetermined values whereby statements can be made about the changes of the shaft behavior and whereby they can be considered in continued testing as necessary. Furthermore, these parameters can also be used to illustrate a virtual sensor for torsion and the moment of the driving shaft.

Additional advantageous embodiments of the invention as well as a more detailed description of the method and the device are shown in the attached drawings.

DETAILED DESCRIPTION OF THE PREFERRED EMBODIMENT

Figure 1:
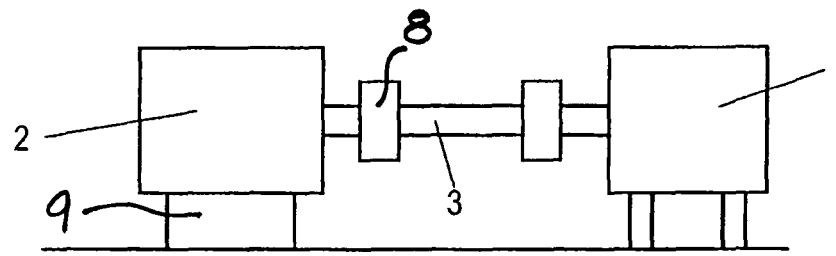
FIG. 1 shows thereby schematically a test bench or a typical device according to the present invention.

As illustrated in FIG. 1, a typical test bench of interest consists of a least three essential components: the test piece (torque generating device 1), the rotating driving and loading mechanism 2, and the driving shaft 3 connecting the two mechanisms 1 and 2. The total behavior of the system is a result of a combination of the characteristics of all three components whereby the torque generating device 1 is typically operated in such a manner that specific characteristics come into play. Also, depicted in FIG. 1 is torque sensor 8 and evaluation unit 9. In a simplified version (FIG. 2), the substantial components can be limited to a rotating mass in respect to the torque generating device 1 and to a rotating mass in respect to the driving and loading mechanism 2 and the driving shaft 3, which is exemplary illustrated in FIG. 2 as parallel switching of resilient elements and damping elements. In the method of the invention rotational speed can be measured at one point and torque at one point, respectively.

Figure 3:
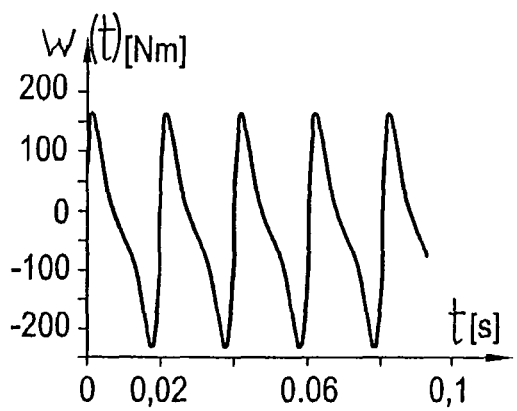
FIG. 3 shows the course of the interference moment created by the irregularities in friction on the torque generating device to be tested over a certain period.

The moments of torsion ($J_1$ or $J_2$) caused by the two mechanisms (1, 2) or the thereby resulting rotational speeds $Y_1(t)$ or $Y_2(t)$ show the condition of the two rotating mechanisms (1, 2). The coupling between the mechanisms (1, 2) determines, for example, in which manner the driving and loading mechanism 2 can influence the dynamics of the test piece 1. The rotational speed will typically fluctuate about a mean value based on the interference moment caused by the irregularity of friction (FIG. 3) in case of a pulled combustion engine used as test piece 1 (as this is mentioned in the claims as a possible advantageous embodiment), which means in case that energy is exerted into the system only on the side of the driving and loading mechanism (u(t)). Taken into consideration is here the fact that the resistance of the combustion engine is a time function in which the compression phases lead to higher resistance moments than during the remaining phases with open valves. This is a reason that such a system cannot be simply illustrated as a linear system since the irregularities of friction must be considered in the observation as a substantial interference, which makes the determination of parameters considerably more difficult in case of a functioning shaft. The characteristics of the driving shaft 3 are therefore measured in a disassembled condition according to normal industrial standards and these parameters are fed into the operational system of the test bench with the goal to make the correct operation of the driving and loading mechanism 2 possible.

However, according to the invention we are dealing only with the issue to achieve the determination of relevant parameters in an assembled condition for several reasons. For example, adjustment to real values can occur since specific changes are possible during the installation. In addition, monitoring of the changes in parameters of the transmission path is made possible, which can be evaluated as indication of increasing wear or as faulty measurement.

Figure 2:
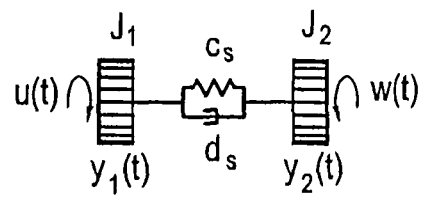
FIG. 2 shows an associated simplified accepted model.
Figure 4:
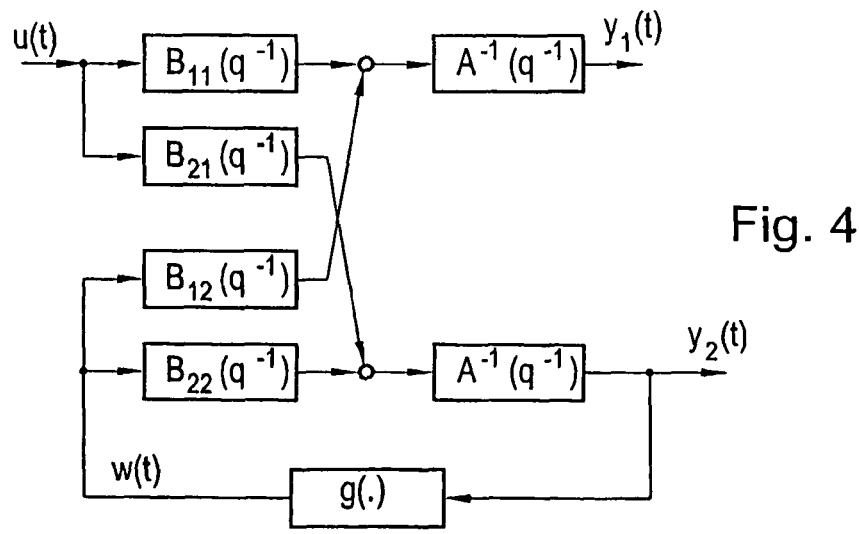
FIG. 4 shows the associated reaction model.

The presently introduced method can also be applied to other complex models of the transmission technology but it is explained here in more detailed based on a simple example of FIG. 2. See FIG. 4 for this purpose, which shows an equivalent illustration of the transmission behavior of the model of the third order under consideration of time-variant resistance factors of the test piece 1. As it can be seen in FIG. 4, it is possible to illustrate these non-linear effects through reaction. Should this model be used, then a mathematical description can be given in the following form:

$$(A(q^{-1}) - B_{22}(q^{-1})\beta_1)A(q^{-1})y_1(t) = ((B_{12}(q^{-1})B_{21}(q^{-1}) - B_{11}(q^{-1})B_{22}(q^{-1}))\beta_1 -$$

$$A(q^{-1})B_{11}(q^{-1}))u(t) +$$

$$B_{12}(q^{-1})A(q^{-1})(\beta_0 + \Delta_S(t))$$

whereby $A(q^{-1})$ are the poles or eigenvalue of the linear system in the polynominal, which means the required characteristics of the transmission shaft, while the additional poles or eigenvalue can be determined through the polynominal $(A(q^{-1})-B_{22}(q^{-1})\beta_1)$, which are created as a result of the irregularities of the movement of the internal combustion engine and which are dependent on the specific operating point. Significant is thereby the fact that the poles of the linear system, which means the zero points of the polynominal $A(q^{-1})$, can be separated in terms of frequency from the additional poles, which means the zero points of the polynominal $(A(q^{-1})-B_{22}(q^{-1})\beta_1)$.

Figure 5:
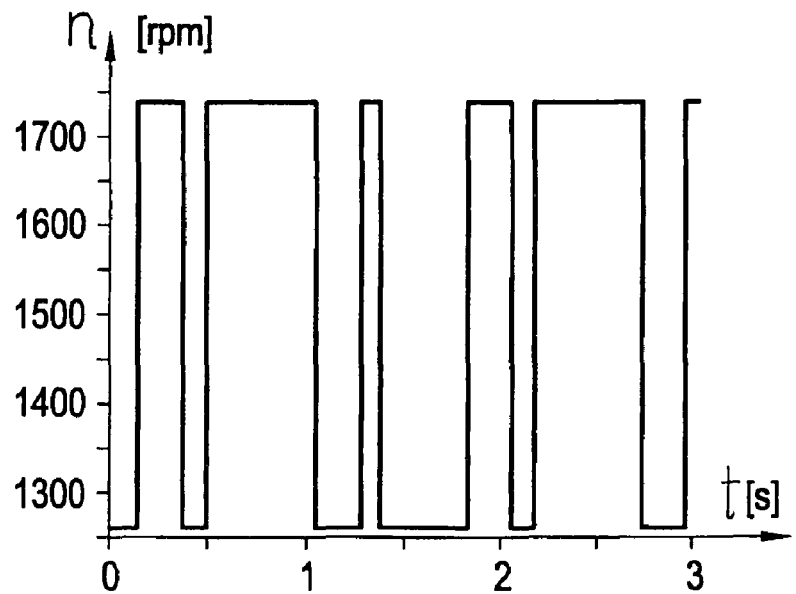
FIG. 5 shows an example of pseudo-stochastic rotational speed stimulation to be used in the inventive method.

Through a slight variation of the operating points it is also possible to determine all poles of the system by means of known methods at each working point from the identification theory (e.g. ARMAX) whereby the poles depending on the working point correspond to the actual poles of the driving shaft 3 to which the lower inherent frequencies can also be assigned, which represents the stiffness and damping characteristic in case of a simple model of the second order. It is thereby possible to differentiate these poles depending on the working point from the poles being independent from the working point by varying the working points—or in case of a constant working point, to differentiate the poles based on their assigned inherent frequencies. The latter case can also be used if only one working point is used for identification. The identification is naturally based on the fact that a sufficiently stimulating signal exists about each working point, which is called incessant stimulation (fortwährende Anregung) in technical terms. This can be in basically different forms—signal noise would be the best. Based on experience, any pseudo-stochastic stimulation with sufficiently large difference is enough. FIG. 5 shows an example of such stimulation as well as the corresponding identification signals. The pseudo-stochastic rotational speeds are randomly switched between two values, 1225 and 1800 rpm. If the parameters of the model are known, then the behavior of the test bench system can be mathematically described sufficiently accurate through this model whereby this description of the test bench behavior applies specifically for three areas of use as follows:

virtual sensors
design of a control mechanism based on the model
monitoring of the system

EXAMPLE 1

Virtual Sensors

The desired measuring signals in virtual sensors are calculated from the conditions of the system since no real sensors are available for this purpose. The knowledge about model parameters allows an estimate of these conditions, yet, these conditions have to be estimated exactly when a sufficiently accurate mathematically model description exists. In concrete terms, determined can be torsion of the driving shaft 3 and the moment of the shaft, i.e. the direct load moment of the test piece 1, whereby the torsion of the shaft can be measured only with great difficulty and through great expenditures. It is important thereby that the shaft moment is different from the moment of the driving and leading mechanism 2 relative to the dynamics of the driving shaft 3. The rotational moment of the driving mechanism and the moment of the loading mechanism are the same in the stationary case. However, it must be mentioned that a purely stationary operation does never occur in the presence of irregularities of friction (see above).

The shaft moment is calculated from a proportional part of the torsion of the driving shaft 3 and a proportional part of the rotational speed difference, which means the difference between the rotational speed of the torque generating device 1 and the rotational speed of the driving and loading mechanism 2.

The proportionality factors correspond exactly to the stiffness and damping characteristic, which means the identifying parameters.

A substantial advantage of a virtual sensor is the fact that an orifice flange can be eliminated without information loss.

EXAMPLE 2

Design of a Control Mechanism Based on the Model

If the mathematical description of the system behavior is known, then it can be used for setting of the control device. Since the test piece behavior is also part of the system behavior, this behavior must also be known so that model-based controls can be used. This behavior can be determined through an identification method for which there is not much detailed interest here (see EP 1 542 848 A1, for example). Different methods can be used if all system parameters are known. The setting of a robust control device could be mentioned, for example. It is assumed thereby that system behavior can vary to a small degree, e.g. through new application of data for the torque generating device 1. The control device is then set in such a manner that it leads to the desired performance under consideration of possibly a variety of models.

Figure 6:
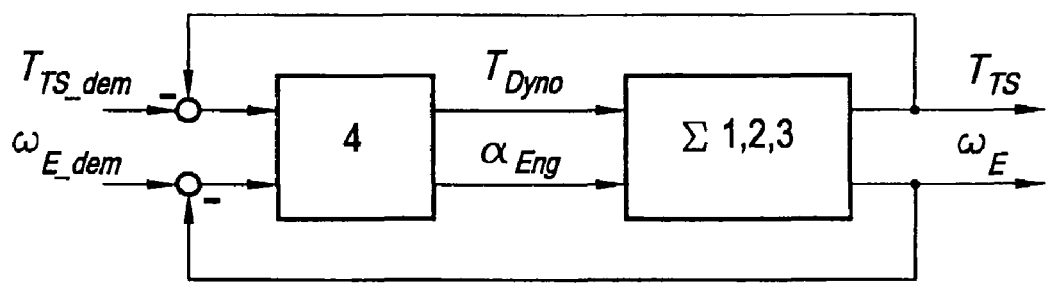
FIG. 6 shows the structure of a control circuit whereby the detected parameters of the driving shaft can be used to adjust the test bench control.

Since the system has two input values (engaging the torque generating device 1, engaging the driving and loading mechanism 2), two values can be adjusted independent from one another. There is often the task to control the rotational speed of the torque generating device 1 and the moment of the shaft. A possible control diagram can be seen for this purpose in FIG. 6 and the following is identified: $T_{TS}$ is the shaft moment, $T_{Dyno}$ is the input (set) moment of the driving and loading mechanism 2, $\alpha_{Eng}$ is the input of the torque generating device 1, $\omega_E$ is the motor speed, $T_{TS\_dem}$ and $\omega_{E\_dem}$ are the desired courses of the shaft moment and the engine speed. Block 4 "control device" contains the control rule, which calculates input values of the system in relationship with the respective test bench parameters so that the predetermined course can be followed the best possible way.

However, a control action must not be necessary a sequential control action as it is discussed in the application mentioned above. An additional possibility of control on the dynamic test bench is zero-mass simulation. The driving and loading mechanism 2 must thereby be adjusted in such a manner that the torque generating device 1 is not biased by said driving and loading mechanism. Inertia and friction of the driving and loading mechanism 2 must be compensated through appropriate adjustment. Besides, the driving shaft 3 must not be distorted, which can again be considered the same as a load on the torque generating device 1. This can be achieved only if the shaft parameters are known so that the adjustment of the driving and loading machine 2 can be set accordingly to compensate the dynamics of the driving shaft 3 as well as the driving and loading mechanism 2.

A third type and a possibility to control the test bench for the dynamic internal combustion engine or the driving engine is vehicle simulation. It is necessary thereby to model the behavior of the drive train relatively accurate and to formulate it mathematically. The torque generating device 1 is then biased with a moment during the vehicle simulation on the dynamic test bench in the same way as it would be biased in the vehicle itself. The driving and loading mechanism 2 must be adjusted in such a manner that the dynamics of the driving shaft 2 is compensated and the dynamics of the drive train is simulated at the same time. Accurate parameters of the driving shaft are necessary on the test bench for compensation of the dynamics of the shaft.

EXAMPLE 3

Monitoring of the System

Figure 7:
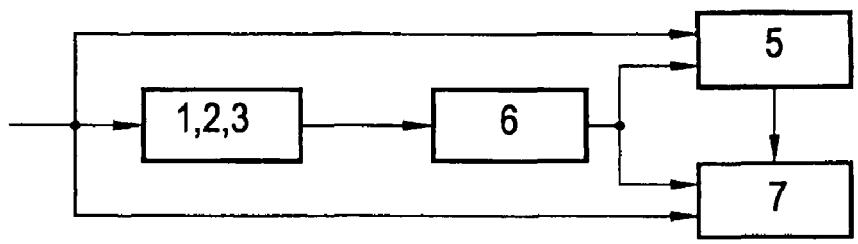
FIG. 7 shows an example of the structure of a monitoring system using the detected parameters of the driving shaft.

The system is monitored on the basis of a path model. A possible structure is shown in FIG. 7. The path model corresponds again to a mathematical description of the system. Inner conditions of the system can be monitored (e.g. torsion of the driving shaft 3) as well as outputs (e.g. rotational speeds on the torque generating device 1 and on the driving and loading mechanism 2). It is essential that a change of path must exist during the appearance of a deviation of the current values from the values calculated by means of a mathematical model. This makes possible, for example, to predict a future break of the driving shaft 3 or it makes further possible to inform the operator about the path change. The operator can then take appropriate actions. Virtual sensors 5 are often used in place of the sensors 6 to monitor the path of unit 7.

We claim:

1. A method for testing a dynamic torque generating device comprising:
   a. connecting an adjustable dynamic rotating mechanism serving as driving or loading mechanism to the torque-generating device via a drive shaft,
   b. determining course of torque transmitted though the drive shaft during an identification phase at pseudo-stochastic rotational speeds, and
   c. determining from the course of torque determined in step (b) parameters that describe dynamic behavior of the drive shaft for use in further testing.

2. The method according to claim 1, including adjusting controls for the driving or loading mechanism based on the determined parameters of step (c).

3. The method according to claim 1, including comparing the determined parameters to predetermined values for determinations about changes of shaft behavior and whereby they can be considered in continued testing as necessary.

4. The method according to claim 1, including using the determined parameters to illustrate a virtual sensor for torsion and moment of the driving shaft.

5. The method according to claim 1, wherein the driving or loading mechanism drives the torque-generating device.

6. The method according to claim 1, including measuring rotational speed at one point and measuring torque at one point, respectively.

7. The method according to claim 1, wherein said parameters include stiffness and damping characteristic of the driving shaft.

8. The method according to claim 1, comprising randomly switching the pseudo-stochastic rotational speeds between two values.

9. A device to determine the dynamic behavior of a driving shaft (3) for a test bench for testing a dynamic torque-generating device, comprising:

a) a torque-generating device (1) to be tested, serving as a torque source or a torque sink on the test bench, connected to a first end of the driving shaft to be tested,
b) an adjustable dynamic rotating mechanism (2), serving as a driving or loading mechanism for the test, connected to a second end of the driving shaft,
c) means to determine course of torque-transmitted through the drive shaft, and
d) means using said course of torque to determine parameters describing the dynamic behavior of the drive shaft.

* * * * *